United States Patent
Moriarity et al.

(10) Patent No.: US 6,437,055 B1
(45) Date of Patent: Aug. 20, 2002

(54) ELECTRODEPOSITABLE COATING FROM GELLED EPOXY-POLYESTER AND AMINE

(75) Inventors: Thomas C. Moriarity, Allison Park; Geoffrey R. Webster, Jr., Gibsonia, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/545,060

(22) Filed: Apr. 7, 2000

(51) Int. Cl.$^7$ .......................... C08L 67/02; C09D 5/44; C25D 13/06
(52) U.S. Cl. .................. 525/437; 204/501; 204/502; 204/504; 204/505; 523/414; 523/415; 525/438; 525/443
(58) Field of Search ................ 204/499, 504, 204/505, 502, 501; 525/437, 440, 443, 438; 523/414, 415

(56) References Cited

U.S. PATENT DOCUMENTS

| | | | |
|---|---|---|---|
| 3,236,895 A | 2/1966 | Lee et al. .................. 260/584 |
| 3,455,806 A | 7/1969 | Spoor et al. ................ 204/181 |
| 3,719,626 A | 3/1973 | May .................... 260/29.2 EP |
| 3,928,157 A | 12/1975 | Suematsu et al. ........... 204/181 |
| 4,104,147 A | 8/1978 | Marchetti et al. ........ 204/181 C |
| 4,148,772 A | 4/1979 | Marchetti et al. ..... 260/29.2 EP |
| 4,302,373 A | 11/1981 | Steinmetz .................. 260/29.3 |
| 4,420,574 A | 12/1983 | Moriarity et al. ........... 523/404 |
| 4,423,166 A | 12/1983 | Moriarity et al. ........... 523/414 |
| 4,432,850 A | 2/1984 | Moriarity et al. ....... 204/181 C |
| 4,480,058 A | 10/1984 | Ting et al. ................. 523/404 |
| 4,536,558 A | 8/1985 | Kordomenos ............... 528/100 |
| 4,579,932 A | 4/1986 | Paar et al. .................. 528/114 |
| 5,096,556 A | 3/1992 | Corrigan et al. ......... 204/181.7 |
| 5,739,213 A | 4/1998 | Freriks et al. .............. 525/438 |
| 5,789,468 A * | 8/1998 | Chung ........................ 523/417 |
| 5,811,198 A | 9/1998 | Freriks et al. .............. 428/482 |
| 5,820,987 A | 10/1998 | Kaufman et al. ........... 428/413 |

* cited by examiner

Primary Examiner—Robert E. L. Sellers
(74) Attorney, Agent, or Firm—Deborah M. Altman

(57) ABSTRACT

The present invention is directed to electrodepositable coating compositions comprising an at least partially gelled resin or reaction product formed from reacting (i) an epoxy-functional polyester with (ii) an amine. The present invention also includes a method for electrocoating a conductive substrate with the described electrodepositable coating compositions. Additionally, the present invention is directed to a conductive substrate coated according to the described method.

19 Claims, No Drawings

ELECTRODEPOSITABLE COATING FROM GELLED EPOXY-POLYESTER AND AMINE

CROSS-REFERENCE TO RELATED APPLICATION

This application relates to U.S. patent application Ser. No. 09/531,807, entitled "Cationic Aliphatic Polyester Resins and Their Use in Electrodeposition", by Raphael O. Kollah, et al., filed Mar. 21, 2000 and U.S. patent application Ser. No. 09/545,059, entitled "Electrodepositable Coating Compositions Including Ungelled Reaction Products of Epoxy Functional Polyesters and Amines, Coated Substrates and Methods of Electrocoating Using the Same", by Thomas C. Moriarity, et al., filed concurrently herewith and both of which are herein incorporated by reference.

FIELD OF THE INVENTION

The present invention relates generally to coating compositions and, more particularly, to electrodepositable coating compositions providing improved chip resistance and edge coverage and/or reduced cratering.

BACKGROUND OF THE INVENTION

Electrodepositable coatings have become the coatings of choice for corrosion protection for metal substrates, such as those used in the automobile industry. Electrodeposition processes provide higher paint utilization, outstanding corrosion protection, low environmental contamination, and a highly automated process compared to conventional non-electrophoretic coating methods.

The electrodeposition process involves immersing an electroconductive substrate into a bath of an aqueous electrocoating composition, the substrate serving as a charged electrode in an electrical circuit comprising the electrode and an oppositely charged counter-electrode. Sufficient electrical current is applied between the electrodes to deposit a substantially continuous, adherent film of the electrocoating composition onto the surface of the electroconductive substrate.

U.S. Pat. Nos. 4,148,772 and 4,104,147 disclose electrocoating compositions including polyepoxides chain extended with polyester polyols. Reaction occurs by the alcoholic primary hydroxyl of the polyester polyol opening the epoxide ring forming an ether linkage and a secondary hydroxyl group (U.S. Pat. No. 4,148,772 at column 3, lines 33–35). The chain extended polyepoxides are reacted with a secondary amine and made dispersible in water with acid.

U.S. Pat. No. 4,536,558 discloses electrodepositable resins which are prepared by reacting polyepoxides with polycarboxylic acids to produce chain extended polyepoxides. The chain extended polyepoxides are then reacted with secondary amines or, optionally, with blends of secondary amines with minor amounts of primary amines, care being taken to avoid gelation.

A problem associated with conventional electrodeposition processes is poor coating coverage at the edges of the coated substrate. The coating thickness at the substrate edges tends to be relatively thinner than that of the non-edge portions of the substrate, which can result in the early onset of corrosion at the substrate edges. Additionally, poor flow characteristics of the coating composition may result in pits or craters formed in the coating.

U.S. Pat. No. 5,096,556 discloses a cationic polyepoxide-amine reaction product and a polyepoxide crosslinking agent which are dispersed in water and heated to crosslink to form a cationic microgel dispersion. The dispersion can be combined with ungelled cationic resins to form an aqueous resinous dispersion suitable for electrodeposition which enhances edge coverage.

An object of the present invention is to provide a composition and process for the production of coatings with improved edge coverage and chip resistance and reduced cratering tendency while additionally providing efficiencies in application and processing, such as improved flow control and/or improved solvent resistance.

SUMMARY OF THE INVENTION

The present invention provides a curable coating composition which comprises an at least partially gelled reaction product prepared from reactants comprising: (a) an epoxy functional material and (b) a polyoxyalkylene polyamine.

Another aspect of the present invention is a curable coating composition comprising an at least partially gelled ionic reaction product prepared from reactants comprising: (a) an epoxy functional polyester and (b) an amine-functional material.

A curable coating composition is provided which comprises an at least partially gelled ionic reaction product prepared from reactants comprising an epoxy functional polyester and a primary amine, wherein the reactants are essentially free of secondary amines.

A coated substrate of the invention has on at least a portion of a surface thereof a coating deposited from a coating composition which comprises: (A) a curable, at least partially gelled reaction product prepared from reactants comprising (i) an epoxy functional polyester; and (ii) a polyoxyalkylene polyamine; and (B) a curing agent.

Another coated substrate of the present invention has on at least a portion of a surface thereof a coating deposited from a coating composition which comprises: (A) an at least partially gelled ionic reaction product prepared from reactants comprising: (i) an epoxy functional polyester prepared from reactants comprising: (1) the reaction product of a polyol and a polycarboxylic acid or anhydrides thereof; and (2) an epoxy functional material; and (ii) an amine-functional material; and (B) a curing agent.

Another aspect of the present invention is a coated substrate having on at least a portion of a surface thereof a coating deposited from a coating composition which comprises an at least partially gelled ionic reaction product prepared from reactants comprising an epoxy functional polyester and a primary amine, wherein the reactants are essentially free of secondary amines.

A method of electrocoating an electrically conductive surface of the present invention comprises passing electric current between an anode and a cathode to cause an electrodepositable coating composition to deposit upon the electrically conductive surface, wherein the coating composition comprises an at least partially gelled reaction product prepared from reactants comprising: (i) an epoxy functional polyester; and (ii) a polyoxyalkylene polyamine.

Another method of electrocoating an electrically conductive surface according to the present invention comprises passing electric current between an anode and a cathode to cause an electrodepositable coating composition to deposit upon the electrically conductive surface, wherein the coating composition comprises an at least partially gelled ionic reaction product prepared from reactants comprising: (i) an epoxy functional polyester prepared from reactants comprising (1) the reaction product of a polyol and a polycarboxylic acid or anhydrides thereof, and (2) an epoxy functional material; and (ii) an amine-functional material.

Yet another method of electrocoating an electrically conductive surface according to the present invention comprises passing electric current between an anode and a cathode to cause an electrodepositable coating composition to deposit upon the electrically conductive surface, wherein the coating composition comprises an at least partially gelled ionic reaction product prepared from reactants comprising an epoxy functional polyester and a primary amine, and wherein the reactants are essentially free of secondary amines.

Yet another method of electrocoating an electrically conductive surface according to the present invention comprises passing electric current between an anode and a cathode, and sequentially depositing first and second electrodepositable coating compositions to form a first coating and a second coating on the electrically conductive surface, wherein the first coating composition comprises an electrically conductive material, and wherein the second coating composition comprises an at least partially gelled reaction product prepared from reactants comprising: (i) an epoxy functional polyester; and (ii) a polyoxyalkylene polyamine.

A still further method of coating a substrate comprises providing a substrate and applying a coating composition upon at least a portion of the substrate, the coating composition comprising an at least partially gelled reaction product prepared from reactants comprising an epoxy functional polyester and a polyoxyalkylene polyamine.

DESCRIPTION OF THE PREFERRED EMBODIMENTS

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers. Additionally, any numeric reference to amounts, unless otherwise specified, are "by weight"; for instance, the phrase "solids of 34%" means "solids of 34% by weight".

The curable coating compositions of the invention comprise one or more at least partially gelled reaction products or additives. The at least partially gelled, e.g., ionic, reaction products of the invention are prepared by reacting one or more epoxy functional polyesters with one or more amine functional materials. The reaction products may be used alone or in combination with another resin and/or other additives to provide curable coating compositions of the present invention. In the following discussion, the coating compositions of the invention are discussed in the context of electrodepositable coating compositions. However, it is to be understood that the coating compositions of the invention are not limited to electrodepositable coatings but can also be used in other coating processes, such as spray coating processes for primers, basecoats, clearcoats or refinish coating compositions.

Epoxy functional polyesters suitable for use in the curable coating composition of the present invention can be prepared by reacting (1) the reaction product of one or more polyols and one or more polycarboxylic acids or anhydrides thereof, and (2) one or more epoxy functional materials.

Examples of suitable polyols useful for forming the polyester reaction product (1) include resorcinol, dihydroxy benzene, aliphatic, cycloaliphatic or aralaphatic hydroxyl containing compounds, such as ethylene glycol, propylene glycol, hydrogenated bisphenol A, dihydroxyl cyclohexane, dimethylol cyclohexane, or combinations thereof. In a preferred embodiment, the polyol is saturated or hydrogenated bisphenol A. The polyol is present in an amount of about 10 weight percent to about 70 weight percent, preferably about 20 to about 50 weight percent, of the reactants to form the reaction product (1).

Examples of suitable polycarboxylic acids and anhydrides thereof useful for forming reaction product (1) for the practice of the invention include aromatic or aliphatic polycarboxylic acids, such as succinic acid, adipic acid, azelaic acid, sebacic acid, maleic acid, fumeric acid, phthalic acid, tetrahydrophthalic acid, hexahydrophthalic acid, trimellitic acid and cyclohexane dicarboxylic acid and anhydrides thereof. In a preferred embodiment, the anhydride of the polycarboxylic acid is methyl hexahydrophthalic anhydride. The acid or anhydride comprises about 30 weight percent to about 90 weight percent, preferably about 50 weight percent to about 80 weight percent, of the reactants. The polyol and acid or anhydride can be reacted with or without a catalyst in any conventional manner known in the art to form the polyester reaction product (1).

The polyester reaction product (1) is reacted with one or more epoxy functional materials. Suitable epoxy-functional materials for the practice of the invention preferably contain at least one epoxy or oxirane group in the molecule, such as di- or polyglycidyl ethers of polyhydric alcohols. Preferably, the epoxy-functional material contains one epoxy group per molecule. Preferred epoxy functional materials are epihalohydrins, such as epichlorohydrin.

Other useful epoxy functional materials include, for example, polyglycidyl ethers of polyhydric alcohols which can be formed by reacting epihalohydrins, such as epichlorohydrin, with polyhydric alcohols, such as dihydric alcohols, in the presence of an alkali condensation and dehydrohalogenation catalyst such as sodium hydroxide or potassium hydroxide. Suitable polyhydric alcohols can be aromatic, aliphatic or cycloaliphatic. An example of a useful saturated polyglycidyl ether of polyhydric alcohol is EPONEX 1510 which is commercially available from Shell Chemical Company of Houston, Tex.

Suitable epoxy-functional materials preferably have an epoxy equivalent weight ranging from about 90 to about 2000, as measured by titration with perchloric acid using methyl violet as an indicator. About 5 weight percent to about 70 weight percent and preferably about 10 to about 25 weight percent of the epoxy functional material is combined or reacted with the polyester described above to form the reaction product of the invention.

Preferably, the epoxy functional polyester is free or essentially free of hydroxy functionality. The term "essentially free" of hydroxy functionality means that the epoxy functional polyester contains less than about 10% hydroxy functionality, preferably less than about 5%, and most preferably is free of hydroxy functionality.

An example of a suitable epoxy functional polyester of the present invention can be produced by first esterifying saturated or hydrogenated bisphenol-A with about two equivalents of 4-methyl hexahydrophthalic anhydride, and reacting the resulting polyester with about two equivalents of epichlorohydrin. Preferably, this polyester has the following general formula I:

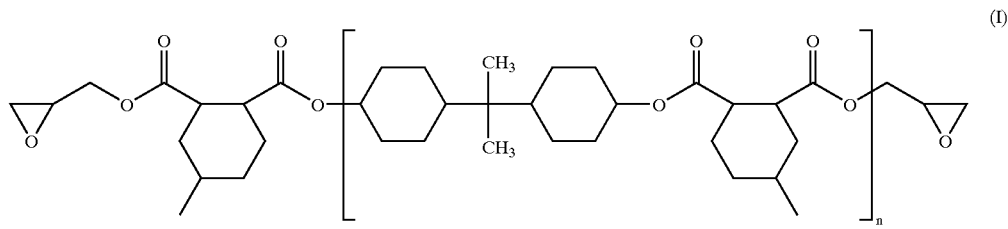

(I)

where n ranges from about 1 to about 15 or, preferably, from about 1 to about 5. As will be appreciated by one of ordinary skill in the art, when preparing the above polyester with a desired n value, some polyesters of different n values can be formed yielding a blended material primarily comprising the desired polyester but also including other similar polyester reaction products.

Another example of a suitable epoxy functional polyester can be prepared by esterification of 2-ethyl-2-butyl-1,3-propane diol with about two equivalents of 4-methyl hexahydrophthalic anhydride, then reacting the resulting polyester with about two equivalents of epichlorohydrin. The alternative epoxy functional polyester comprises a branched aliphatic material having the following general formula II:

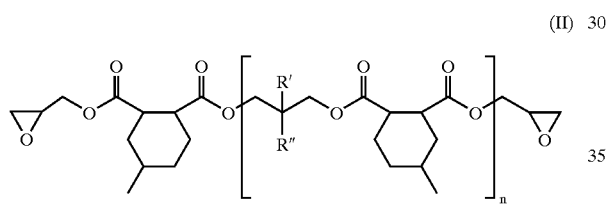

(II)

where n ranges from about 1 to about 15, or, preferably, ranging from about 1 to about 5. R' and R" represent independently selected hydrogen, alkyl groups or aromatic groups. The alkyl groups can be, for example, methyl, ethyl, propyl or butyl groups. Preferably, R' is an ethyl group and R" is a butyl group.

Another example of a suitable epoxy functional polyester can be prepared by reacting saturated bisphenol A and about two equivalents of 4-methyl hexahydrophthalic anhydride and reacting the resulting polyester with a saturated polyglycidyl ether of a polyhydric alcohol, such as EPONEX 1510.

In the practice of the invention, the epoxy functional polyester is reacted with one or more amine functional materials, such as primary, secondary, or tertiary amines, or polymers thereof. Preferred amine functional materials useful in the practice of the invention include primary amines, such as butyl amine or hexyl amine, more preferably diamines, such as ethyl diamine, 1,4-butanediamine or 1,6-hexanediamine.

In a preferred practice of the invention, the amine functional material preferably comprises polyoxyalkylene polyamines, such as polyoxymethylene diamine, polyoxyethylene diamine, polyoxypropylene diamine, polyoxybutylene diamine or mixtures thereof.

An example of a preferred polyoxyalkylene polyamine is represented by the following structural formula:

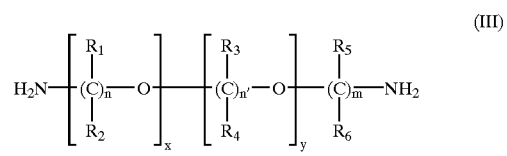

(III)

where m can range from 0 to about 50, n can range from about 1 to about 50, n' can range from about 1 to about 50, y can range from 0 to about 50, and $R_1$ through $R_6$ can be the same or different and can be independently selected from the group consisting of hydrogen or lower alkyl radicals preferably having about 1 to about 6 carbon atoms.

Another example of a preferred polyoxyalkylene polyamine is represented by the formula:

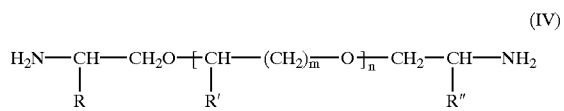

(IV)

where R, R' and R" can be the same or different and are independently selected from the group consisting of hydrogen or lower alkyl radicals preferably having from about 1 to about 6 carbon atoms. The number m preferably ranges from 0 to about 6 and the number n can range from about 1 to about 50, preferably from about 4 to about 40.

Non-limiting examples of preferred polyoxyalkylene amines include Jeffamine® D-2000 and Jeffamine® D-400 which are commercially available from Huntsman. *Huntsman Technical Bulletin for Jeffamine D-2000 Polyoxypropylene Diamine,* 1994, hereby incorporated by reference, describes a preferred polyoxypropylene diamine and gives an average value of 33.1 for n. Particularly preferred is the compound in which R, R' and R" are all methyl radicals. Other useful polyoxyalkylene polyamines are described in more detail in U.S. Pat. No. 3,236,895, column 2, lines 40–73; methods of preparation of the polyoxyalkylene polyamines are illustrated in the patent in Examples 4, 5, 6 and 8–12 in columns 4–9 thereof; the aforementioned portions of U.S. Pat. No. 3,263,895 hereby being incorporated by reference.

It is preferred, for the preparation of a reaction product of the present invention with the desired characteristics, that the amine functional material used in the practice of the invention be essentially free of secondary amines. As used herein, "essentially free of secondary amines" means that the reactants from which the reaction product of the epoxy functional polyester and amine functional material are prepared comprises less than about 10% by weight, preferably less than about 5%, and more preferably is free of secondary amines.

In a currently preferred method of preparing the reaction products of the invention, a prepolymer material is first prepared. To form the prepolymer, the epoxy functional polyester, for example 80% solids by weight dissolved in methyl isobutyl ketone, is added to the amine functional material and heated to a temperature of about 50° to 120° C., preferably from about 80° C. to about 110° C., for about 11 hours to form a non-gelled prepolymer. The reaction is preferably allowed to proceed until about 30% to about 80% of the epoxy groups are reacted. The prepolymer material is then dispersed in aqueous medium and at least partially neutralized with acid. Suitable acids include organic acids such as formic acid, lactic acid and acetic acid, and inorganic acids such as sulfamic acid. For example, the prepolymer material can be added to a premix of sulfamic acid in water, with the sulfamic acid present in an amount of about 0.2 to about 0.9 equivalents of acid per one equivalent of amine to form a dispersion. This dispersion is then heated to a temperature sufficient to advance crosslinking or gellation of the epoxy polyester and amine-functional material, e.g. about 50° C. to about 98° C. for about 1 to about 10 hours, to form a cationic dispersion of an at least partially gelled reaction product of the invention.

The term "dispersion" as used within the context of the present invention means a two-phase transparent, translucent or opaque aqueous resinous system in which the reaction product or resin is the dispersed phase and water the continuous phase.

By "at least partially gelled" is meant that the reaction product of the epoxy polyester and the amine-functional material is at least partially crosslinked. The degree of crosslinking or "gelling" of the reaction product can be determined in conventional manner, for example, by recovering crosslinked microparticles from the dispersion, such as by removing the diluent by evaporation. The dried material can be placed in a Soxhlet extractor and extracted for about 12 hours in boiling solvent, such as tetrahydrofuran. To be considered "gelled", at least 25 percent by weight, preferably 50 percent by weight, of the microparticles should not be extractable. A suitable such procedure is disclosed in U.S. Pat. No. 5,096,556, at column 2, lines 39–46.

Another way of determining whether the reaction product of the invention is at least partially gelled is to take about 1.0 ml to about 10.0 ml of the dispersion containing the reaction product of the epoxy polyester and amine-functional material (about 30 weight percent solids in water) and heating the reaction product to a temperature of about 95° C. After two hours of heating, a one gram sample of the dispersion is taken each hour and added to about 10 grams of a solvent known not to attack the polymer, such as DMSO, acetone, or tetrahydrofuran. Gelling is indicated when the sample exhibits visual haziness.

The dispersion can include solvents such as hydrocarbons, ethers, alcohols, ether-alcohols and ketones, such as methyl isobutyl ketone. The amount of solvent used can vary from about 0 to about 90 weight percent, preferably about 5 to about 50 weight percent based on total weight of the reaction mixture.

The equivalent ratio of epoxy groups in the epoxy functional material (i) to amine groups in which the amine functional material (ii) is a primary diamine generally can range from about 1.1:1 to about 3.9:1 to produce reaction products having desirable properties. Equivalent ratios greater than about 3.9:1 and less than about 1.1:1 generally are not preferred because a gel may not be formed. The above discussed equivalent ratios relate epoxy groups to amine groups. As will be appreciated by one of ordinary skill in the art, these ratios would be different if other standards were used as the basis of the ratio, such as relating NH groups, for example, to epoxy groups. For amine-functional materials generally, the ratio of —NH equivalents to epoxy equivalents can range from about 0.51:1 to about 1.81:1.

The reaction product of the epoxy functional polyester and the amine functional material is characterized as being substantially free from primary hydroxyl functionality and includes epoxy functionality, preferably secondary or tertiary amine functionality with little or no primary amine functionality.

Preferred coating compositions of the invention comprise a percentage by weight of the at least partially gelled reaction product within the range from about 0.1% to about 50% on a basis of total resin solids, preferably about 1 to about 10 weight percent. The concentration of the resinous phase in aqueous medium depends upon the particular end use of the dispersion and is generally not critical. The reaction products of the invention can be dispersed in a carrier, such as water and/or solvent. The aqueous medium and the dispersion can contain from at least about 0.01, and usually from about 0.01 to about 20 percent by weight of the reaction product of the invention based on total weight of the aqueous composition.

The at least partially gelled reaction product of the invention can preferably be used in cationic electrodepositable coating compositions or can be modified to form an anionic coating composition. The system will require different chemistry for anionic systems.

The electrodepositable compositions of the invention preferably further comprise one or more cationic crosslinkable or self-crosslinking film-forming materials or resins such as epoxy resins, polyester resins different from the reaction product described above, polyurethane resins, acrylic resins, copolymers and mixtures thereof in an amount of about 20 to about 99.9 weight percent.

Suitable epoxy functional resins for use as film-forming resins include epoxy functional materials discussed above which are different from the epoxy functional polyester, for example, those disclosed in U.S. application Ser. No. 09/309,850 and U.S. Pat. No. 5,820,987, herein incorporated by reference.

Examples of suitable polyester film forming resins are disclosed, for example, in U.S. Pat. Nos. 5,739,213 and 5,811,198 and the concurrently filed application entitled "Cationic Aliphatic Polyester Resins and Their Use in Electrodeposition", herein incorporated by reference. The polyester film-forming resins have different chemical structures than the epoxy polyester reaction product discussed above. An exemplary polyester film-forming material comprises the reaction product of an aromatic and/or cycloaliphatic carboxylic acid compound comprising at least two aromatic and/or secondary aliphatic carboxyl groups, or an anhydride thereof; a branched aliphatic, cycloaliphatic or araliphatic compound containing at least two aliphatic hydroxyl groups, the aliphatic hydroxyl groups being either secondary or tertiary hydroxyl groups or primary hydroxyl groups attached to a carbon adjacent to a tertiary or quaternary carbon; a compound comprising an ionic salt group or a group which is converted to an ionic salt group; and optionally, at least one hydroxyl substituted carboxylic compound comprising at least one tertiary aliphatic carboxyl group and at least two aliphatic hydroxyl groups. Preferably, the ionic salt group equivalent weight of the polyester polymer is between 1,000 and 10,000.

Useful polyurethane resins include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

Suitable acrylic-functional resins include polymers derived from alkyl esters of acrylic acid and methacrylic acid such as are disclosed, for example, in U.S. Pat. Nos. 3,455,806 and 3,928,157, which are incorporated herein by reference.

The coating composition of the invention preferably further comprises one or more curing or crosslinking agents for curing curable groups of the at least partially gelled reaction product and/or the film-forming material. Suitable crosslinking agents include aminoplast resins, blocked or unblocked polyisocyanates, and mixtures thereof. For electrodepositable coating compositions, blocked polyisocyanates are preferred. Instead of a separate curing agent, the film-forming resin may be self-crosslinkable, i.e., may include crosslinkable components as part of the resin.

Useful curing agents include blocked or unblocked polyisocyanates, including aromatic diisocyanates such as p-phenylene diisocyanate, 4,4'-diphenylmethane diisocyanate and 2,4- or 2,6-toluene diisocyanate; aliphatic diisocyanates such as 1,4-tetramethylene diisocyanate and 1,6-hexamethylene diisocyanate; and cycloaliphatic diisocyanates such as isophorone diisocyanate and 4,4'-methylene-bis(cyclohexyl isocyanate). Examples of suitable blocking agents for the polyisocyanates include amines, such as dibutyl amine, lower aliphatic alcohols such as methanol, oximes such as methyl ethyl ketoxime amines and lactams such as caprolactam. The amount of the curing agent in the electrodepositable coating composition can range from about 5 to about 50 weight percent on a basis of total resin solids weight of the electrodepositable coating composition.

Other useful aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, such as diazines, triazoles, guanidines, guanamines and alkyl and aryl-substituted derivatives of such compounds.

The electrodepositable coating composition of the invention also can comprise one or more pigments which can be incorporated in the form of a paste, surfactants, wetting agents, catalysts, film build additives, flatting agents, defoamers, flow control agents, pH control additives and carrier materials such as water and/or organic solvents. Useful pigments and fillers for the practice of the invention include iron oxides, lead oxides, carbon black, titanium dioxide, clay and talc.

In a currently preferred practice, the coating composition of the invention can be used to form a single layer, i.e. monocoat, coating on a substrate. Alternatively, the coating composition of the invention can be used to form one or more of multiple layers of coatings upon the substrate, which can be pretreated as described below. Still further, the at least partially gelled reaction product of the invention can be used as an additive in a conventional coating composition to improve flow characteristics and promote edge coverage. For example, the reaction product can be present in an electrodepositable coating composition as the second coat of a two-coat electrodeposited coating. The first coat of such a two-coat system preferably comprises an electrically conductive coating material comprising a curable film-forming resin as discussed above, a curing agent and an electrically conductive pigment.

The first coat is formed by electrodepositing the electrically conductive coating material onto the surface of an electrically conductive substrate. The first coating composition may be an anionic electrodepositable composition or a cationic electrodepositable composition, which is preferred. Preferred anionic and cationic electrodepositable compositions are those which provide high throwpower and good corrosion resistance. Suitable first coating compositions are well known in the art and are disclosed, for example, in U.S. patent application Ser. No. 09/309,851, herein incorporated by reference.

Examples of ionic resins suitable for use in such cationic electrodepositable coating compositions include amine salt group-containing resins such as the acid-solubilized reaction products of polyepoxides and primary or secondary amines which can be used in combination with a partially or fully blocked isocyanate curing agent. Other useful ionic resins and components of electrodepositable coating compositions are described in U.S. patent application Ser. No. 09/309,851.

The electrodepositable compositions for the first coat contain an electroconductive pigment to make the resultant coating electroconductive. Suitable electroconductive pigments include electrically conductive carbon black pigments, such as described in U.S. application Ser. No. 09/309,851.

The method of applying the first coating composition makes use of the electrodepositable compositions described above and depends upon the electrical conductivity of the substrate material. Most electroconductive substrates, especially metal substrates such as steel, zinc, aluminum, copper, magnesium, or the like and galvanized metals can be coated with the electrodepositable compositions. In a currently preferred practice, the substrate is steel or galvanized steel. Prior to treatment according to the method of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate.

In a preferred method of applying the electrically conductive first coat, the aqueous dispersion of the first electrodepositable composition is placed in contact with an electrically conductive anode and cathode. Upon passage of an electric current between the anode and cathode, an adherent film of the electrodepositable composition will deposit in a substantially continuous manner on either the anode or the cathode depending on whether the composition is anionically or cationically electrodepositable. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter).

After electrodeposition, the first coat is at least partially cured, typically by heating in air. Temperatures usually range from 200° F. to 400° F. (93.3° C. to 204.4° C.), preferably from 300° F. to 375° F. (149° C. to 191° C.) for a period of time ranging from 10 to 60 minutes. The thickness of the resultant film is usually from about 10 to 50 microns.

The heating or baking of the electrodeposited first coat can also be performed by means of infrared radiation ("IR"). Curing can be done in a selected manner, such as described in U.S. application Ser. No. 09/309,851.

After application of the first electroconductive coating, the second coating composition preferably is electrodeposited over the first coat. The second coating composition comprises the reaction product of an epoxy functional polyester and an amine, preferably a polyoxyalkylene polyamine, as described above, a curing agent and optionally pigment, etc. as described above. The second electrodeposited coating can be cured in a similar manner to that described above for the first coating composition. In a currently preferred practice, the preferred film former is a self-curing polyurethane as set forth in Table I below.

The combination of coatings not only provides corrosion resistance, but can provide enhanced chip and humidity resistance. The first electrodeposited coat can provide corrosion resistance and the second electrodeposited coat can enhance chip resistance and humidity resistance as well as the workability of the system.

Illustrating the invention are the following examples which, however, are not to be considered as limiting the

EXAMPLE

This example shows the preparation of a cationically electrodeposited coating according to the present invention applied to a substrate.

In this example, two white electrocoats were prepared to determine the effect of the at least partially gelled reaction product of the invention on surface profile and edge coverage characteristics of the coatings.

Preparation of Gelled Reaction Product

In the preparation of the gelled reaction product described below, the epoxy polyester referred to as Epoxy Polyester 1 had the approximate structure indicated in formula I above in which n ranged from about 1 to about 5, and was used in the form of an 80 weight percent solution in methylisobutyl ketone. Also, throughout the following discussion, the numbers in parenthesis refer to the components described in the Table immediately following the discussion.

To produce the gelled reaction product of the invention, Jeffamine D-2000 polyoxypropylene diamine (1) and Epoxy Polyester 1 (2) were combined and heated to 100° C., and held until the Gardner viscosity of a sample diluted to 60% solids in Dowanol PM methoxypropanol, commercially available from Dow Chemical Company, was U-V. Typically this required about 11 hours. The resulting prepolymer was solubilized into a mixture of sulfamic acid and water (3) as indicated. After the mixture was well dispersed, deionized water (4) was added and mixed in well. The resulting aqueous dispersion was then poured into a 12 liter four necked flask and heated to 95° C. and held at this temperature for 6 hours. The temperature was then adjusted to 60–650° C. and water and solvent were distilled off under vacuum to give a solids content of about 36%. Water was then added back to the reaction mixture to give a solids content of 32.6%. The amount of solvent and water distilled off and the quantity of water added back may be varied to give aqueous dispersions of various solids content.

TABLE 1

| Material | Weight |
| --- | --- |
| 1 Jeffamine D-2000[1] | 893.70 |
| 2 Epoxy Polyester 1 (80% in methylisobutyl ketone) | 860.40 |
| TOTAL Solubilization | 1754.10 |
| Weight of above resin to be solubilized | 1490.99 |
| 3 Sulfamic acid | 22.28 |
| Deionized water | 1220.73 |
| 4 Deionized water | 1822.67 |
| | 4556.66 |

1. Jeffamine D2000 polyoxyalkaline diamine is commercially available from Huntsman Corporation.

Preparation of Sulfonium Polyester Resin

An example of a sulfonium polyester resin used in the coating compositions of this Example was prepared from the ingredients listed in Table 2.

The Epoxy Polyester 1 (1) and CHDA-HPA Adduct (2) (defined in Table II below) were charged to a reaction vessel and heated under a nitrogen blanket to 105° C. and held at temperature until the CHDA-HPA Adduct (2) completely dissolved. Ethyltriphenylphosphonium iodide (3) was added as a catalyst and the reaction was allowed to exotherm, followed by a one-hour hold at 130° C. to achieve a theoretical epoxy equivalent weight (EEW) of 1245. PROPASOL® B solvent (4) was added to cool the reaction to 75° C. followed by addition of thiodiethanol (5), lactic acid (6) and the first portion of water (7) listed. The reaction mixture was then heated to 75° C. and held for 2 hours until a minimum acid value of 5.1 was observed. The crosslinker (8) was then added, and the solution was mixed for 15 minutes. The final (second listed) portion of water (9) was then added to the resin sequentially under agitation to produce a dispersion of organic resin in an aqueous phase. Volatiles were vacuum distilled from the resin at 60° C. for 5 hours, resulting in a final resin solids of 41.35%.

TABLE 2

| INGREDIENTS | PARTS BY WEIGHT |
| --- | --- |
| 1 Epoxy Polyester 1 | 449.17 |
| 2 CHDA-HPA Adduct[1] | 132.30 |
| 3 Ethyltriphenylphosphonium Iodide | 1.10 |
| 4 PROPASOL® B[2] | 96.17 |
| 5 Thiodiethanol (50% solids) | 113.87 |
| 6 Lactic Acid (88% in water) | 47.74 |
| 7 Deionized Water | 25.20 |
| 8 Crosslinker[3] | 567.47 |
| 9 Deionized Water | 1727.01 |

[1]Cyclohexane dicarboxylic acid and hydroxy pivalic acid at a 1:2 ratio, respectively (100% solids).
[2]2-butoxy propanol commercially available from Union Carbide Corp.
[3]DESN 3300® HDI Trimer commercially available from Bayer Corporation 100% blocked with dibutyl amine (75% solids in MIBK).

Preparation of Grind Vehicle for DBTO Catalyst Paste

An example of a dibutyl tin oxide (DBTO) catalyst paste (Table 5 below) used in the white coating compositions of this Example includes a polyester quaternary grind vehicle (Table 4 below) prepared from the reactants of Table 3 below as follows. With particular reference to Table 3, Methyl isobutyl ketone (MIBK) (1) and dimethylethanolamine (2) were added to a 2 L flask equipped with an addition funnel, nitrogen purge, and stirrer. A blanket of nitrogen was placed over the solvent and the MIBK was heated to 30° C. while stirring. The IPDI Adduct (3) (described in footnote 1 of Table 3) was added dropwise and the exotherm stabilized at approximately 60° C. The solution was held at 60° C. until no isocyanate peak was observed for samples evaluated by IR spectroscopy. The solution was heated and held at 50° C. while the Proposol B (4) was added. Lactic acid (5) was then added dropwise and the system was allowed to exotherm. The water (6) was added slowly and the solution was allowed to cool to room temperature.

TABLE 3

(Amine Salt Quaternizing Compound)

| INGREDIENTS | PARTS BY WEIGHT |
| --- | --- |
| 1 MIBK | 4.68 |
| 2 Dimethylethanolamine | 89 |
| 3 IPDI Adduct[1] | 410.78 |
| 4 PROPASOL® B | 41.98 |
| 5 Lactic Acid (88% in water) | 121.74 |
| 6 Deionized Water | 99.7 |

[1]Isophorone diisocyanate with half of the isocyanate content reacted with 2-ethylhexanol, 80% solids in methyl isobutyl ketone.

To form a polyester quaternary grind vehicle used in the dibutyl tin oxide (DBTO) catalyst paste as described below, Epoxy Polyester 1 (1) and CHDA-HPA Adduct (2) were charged to a reaction vessel and heated under a nitrogen blanket to 105° C. and held at temperature until the CHDA-HPA Adduct (2) completely dissolved. Ethyltriphenylphosphonium iodide (3) was added as a catalyst and the reaction allowed to exotherm followed by a one-hour hold at 130° C. for a theoretical epoxy equivalent weight (EEW) of 1262. The PROPASOL® B (4) solvent was added while allowing the reaction to cool to a temperature of 85° C. followed by addition of the reaction product of the reactants of Table 3 (5) to cool the resin solution to 75° C. The reaction was then held at 75° C. and titrated to obtain an acid value minimum, i.e., titrated until a constant acid value was obtained. The water (6) was added under agitation to produce a dispersion of organic resin in an aqueous phase. Approximately 650 grams of volatiles were then vacuum distilled from the resin at 60° C., resulting in a final resin solids of 36.8%.

TABLE 4

(Quaternary Grind Vehicle)

| INGREDIENTS | PARTS BY WEIGHT |
| --- | --- |
| 1 Epoxy Polyester 1 (80% solids in methyl isobutyl ketone) | 821.1 |
| 2 CHDA-HPA Adduct | 240.5 |
| 3 Ethyltriphenylphosphonium Iodide | 1.1 |
| 4 PROPASOL ® B | 95.61 |
| 5 Reaction Product of Reactants of Table 3 | 360.59 |
| 6 Deionized Water | 2143.4 |

A DBTO catalyst paste used in the white coating compositions of this Example was prepared as shown in Table 5. The quaternary grind vehicle (1), dibutyl tin oxide (2), and deionized water (3) were sequentially added under agitation and mixed until well blended. A RED HEAD laboratory dispersion mill, commercially available from Chicago Boiler Company, was filled with ceramic beads, and cold water was circulated through the unit's cooling jacket. The components of Table 5 were added to the dispersion mill and ground for 3 hours. After grinding, the particle size was reduced to a Hegman value of 7, as measured using a Hegman fineness of grind gauge commercially available from Gardner Company.

TABLE 5

(DBTO Catalyst Paste)

| INGREDIENTS | PARTS BY WEIGHT |
| --- | --- |
| 1 Quaternary Grind Vehicle (from Table 4) | 402.6 |
| 2 Dibutyl Tin Oxide | 370.3 |
| 3 Deionized Water | 427.1 |

Preparation of Tint Paste Grind Vehicle

A tint paste polyester quaternary grind vehicle used in the white tint pastes of this Example was prepared from the ingredients listed in Table 6.

The Epoxy Polyester 1 (1) and CHDA-HPA Adduct (2) (Table 3) were charged to a reaction vessel and heated under a nitrogen blanket to 105° C. and held at temperature until the CHDA-HPA Adduct (2) completely dissolved. Ethyltriphenylphosphonium iodide (3) was added and the reaction allowed to exotherm followed by a one-hour hold at 130° C. for a theoretical epoxy equivalent weight (EEW) of 1207. The solvent PROPASOL® B (4) was added to cool the reaction to 75° C. followed by slow addition of the IPDI Adduct (5) over 15 minutes. The reaction was then held until no isocyanate was observed by IR spectroscopy. The quaternary salt was then formed by adding a premix of n,n-dimethylethanolamine (6), lactic acid (7), and water (8) followed by a hold for an acid value minimum. The final portion of water (9) was added under agitation to produce a dispersion of organic resin in an aqueous phase. Approximately 1300 grams of volatiles were then vacuum distilled off of the resin at 60° C., resulting in a final resin solids of 37%.

TABLE 6

(Tint Paste Grind Vehicle)

| INGREDIENTS | PARTS BY WEIGHT |
| --- | --- |
| 1 Epoxy Polyester 1 (80% solids in MIBK) | 2808.40 |
| 2 CHDA-HPA Adduct | 801.7 |
| 3 Ethyltriphenylphosphonium Iodide | 3.6 |
| 4 PROPASOL ® B | 309.07 |
| 5 IPDI Adduct | 446.30 |
| 6 n,n-Dimethylethanolamine | 149.52 |
| 7 Lactic Acid (88% in Water) | 171.86 |
| 8 Deionized Water | 90.00 |
| 9 Deionized Water | 4000 |

Preparation of Tint Paste

A typical white tint paste was prepared by adding sequentially the ingredients (1)–(5) listed in Table 7 under agitation, and mixing them until they were well blended. A RED HEAD laboratory dispersion mill was filled with ceramic beads and cold water was circulated through the mill's cooling jacket. The ingredients (1)–(5) were added to the dispersion mill and ground for 45 minutes. After grinding, the particle size as reduced to a Hegman value of greater than 7, as measured using a Hegman fineness of grind gauge.

TABLE 7

(Tint Paste)

| INGREDIENTS | PARTS BY WEIGHT |
| --- | --- |
| 1 Tint Grind Vehicle (Table 6) | 2099.56 |
| 2 PROPASOL ® B | 25.64 |
| 3 Deionized Water | 68.35 |
| 4 Titanium Dioxide Pigment | 3107.35 |
| 5 Deionized Water | 674.78 |

White Color Coating Compositions

White color coating compositions for Paint I (no gelled reaction product of the invention) and Paint II (containing the gelled reaction product of the invention) were prepared as discussed in Tables 8 and 9, respectively, below.

A. Paint I

The ingredients (1)–(5) listed in Table 8 were added sequentially with agitation. The final paint was allowed to stir at least 24 hours prior to use.

TABLE 8

White Paint I: No Gelled Reaction Product

| INGREDIENTS | PARTS BY WEIGHT |
| --- | --- |
| 1 Sulfonium Polyester Resin, as described above (Table 2), actual solids 37.77% | 1019.1 |
| 2 PROPASOL ® B | 23.12 |

TABLE 8-continued

White Paint I: No Gelled Reaction Product

| INGREDIENTS | PARTS BY WEIGHT |
| --- | --- |
| 3 White Tint Paste, as described above (Table 7), actual solids 67.08% | 269.1 |
| 4 DBTO Catalyst Paste, as described above (Table 5), actual solids 43.2 | 10.26 |
| 5 Deionized Water | 2479 |

A. Paint II

Paint II described in Table 9, the sulfonium epoxy resin (1) was added to a plastic container. The Proposol® B (2) and the gelled reaction product (3) were premixed together until uniform and then added to the sulfonium resin (1) under agitation. The remaining ingredients (4)–(6) were added sequentially under agitation. The final paint was allowed to stir for at least 24 hours prior to use.

TABLE 9

White Paint II: 10% on Resin Solids Flow Control Additive

| INGREDIENTS | PARTS BY WEIGHT |
| --- | --- |
| 1 Sulfonium Polyester Resin, as described above (Table 2), actual solids 37.77% | 907.11 |
| 2 PROPASOL ® B | 22.83 |
| 3 Gelled Reaction Product as described above (Table 1), actual solids 36.78% | 114.80 |
| 4 White Tint Paste, as described above (Table 7), actual solids 69.97% | 258.3 |
| 5 DBTO Catalyst Paste, as described above (Table 5), actual solids 43.0% | 10.24 |
| 6 Deionized Water | 2486.7 |

Evaluation

The Paints I and II were electrocoated cationically to a nominal film build of 1.2 mils (30.5 microns) on 4"×6" phosphated steel (B962 P60) panels commercially available from ACT Laboratories Inc., and on ACT code APR29176 B958 P60 ed knife blades also available from ACT Laboratories Inc. For the 4"×6" panels, typical application conditions were 150V. 0.5 amp. limit, 90° F. bath temperature for 2 minutes applied voltage. The knife blades were coated at 90° F. bath temperature, 0.1 amp limit for a total of 3 coulombs per blade.

These two Paints I and II were evaluated for profile, cure temperature, and edge coverage.

The cure temperatures were measured using acetone double rubs, a test procedure familiar to those skilled in the art. The coated panels were placed in an electric oven set at the test temperature listed in Table 10 and baked for 20 minutes. The panels were then removed from the oven and allowed to cool to room temperature. The acetone double rubs (maximum 100) were then run on each panel at the given cure temperature. Each panel was rated as follows:
0—completely rubs through paint in less than 10 double rubs
1—completely rubs through paint between 11 and 50 double rubs
2—completely rubs through paint between 51 and 100 double rubs
3—severe marring and dulling of the entire rubbed area
4—severe marring and dulling over 50% of the rubbed area
5—severe scratching over the entire area with some marring
6—little to no marring, but scratching over the entire area
7—scratching over 50% of the rubbed area
8—slight scratching
9—very little scratching
10—no effect The results are shown in Table 10.

TABLE 10

| Paint | Temperature | Rating |
| --- | --- | --- |
| White Paint I | 280° F. | 0 |
| White Paint I | 300° F. | 2 |
| White Paint I | 320° F. | 4 |
| White Paint I | 340° F. | 6 |
| White Paint II | 280° F. | 1 |
| White Paint II | 300° F. | 2 |
| White Paint II | 320° F. | 7–8 |
| White Paint II | 340° F. | 9 |

All remaining panels for testing were cured at 340° F. for 30 minutes.

Profiles were measured using a Taylor Hobson Surtronic 3+ profilometer with a length of measurement of 0.15 inch (4.8 mm) and a cutoff length of 0.03 inch (0.762 mm). The results are show in Table 11:

TABLE 11

| Paint | Ra* (average of 3 readings) |
| --- | --- |
| White Paint I | 5.33 |
| White Paint II | 20 |

*Ra is the average of the deviation of the profile from the mean line in microinches.

Edge coverage was observed (a) visually and (b) measured by using a knife blade corrosion test.

(a) Visually, the paint including the reaction product of the invention had better edge coverage. For White Paint I, the substrate was visible at the edges of the panels and the knife blades. For White Paint II, the substrate edges were completely hidden from view.

(b) The edge coverage test using the knife blades is a corrosion test. The coated blades as described above were placed for 6 days in a 5% salt fog cabinet (ASTM B117 standard). The blades were mounted onto an Aluminum panel and placed vertically in the cabinet so that the knife blade edges were vertical. The blades were rated as follows:
1—90% or more of the blade edge corroded
2—80% to 90% of the blade edge corroded
3—70% to 80% of the blade edge corroded
4—60% to 70% of the blade edge corroded
5—50% to 60% of the blade edge corroded
6—40% to 50% of the blade edge corroded 7—30% to 40% of the blade edge corroded
8—20% to 30% of the blade edge corroded
9—10% to 20% of the blade edge corroded
10—0% to 10% of the blade edge corroded
Percent of blade edge corroded was determined by visual inspection.

TABLE 12

| Paint | Rating* |
|---|---|
| White Paint I | 5.5 |
| White Paint II | 5.7 |

*Average of 3 runs for White Paint II, and 4 runs for White Paint I

The gelled reaction product of the invention appears to restrict the flow of the coating during curing, resulting in improved opacity at the edges of panels and by an increase in the profile of the paint when the gelled reaction product is present.

The above invention has been described with reference to the preferred embodiment. Other modifications and alterations will occur to others upon reading and understanding the preceding detailed description. It is intended that the invention be construed as including all such modifications and alterations insofar as they come within the scope of the appended claims or the equivalents thereof.

Therefore, we claim:

1. A curable coating composition comprising an at least partially gelled reaction product prepared from reactants comprising:
   (a) an epoxy functional polyester; and
   (b) a polyoxyalkylene polyamine wherein the epoxy functional polyester is selected from the group consisting of the following formulae (I) or (II)

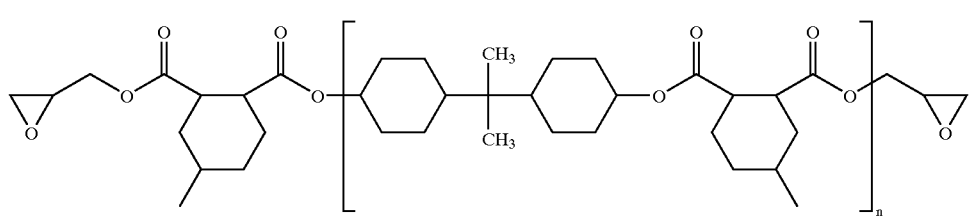

wherein n is an interger ranging from about 1 to about 15, and

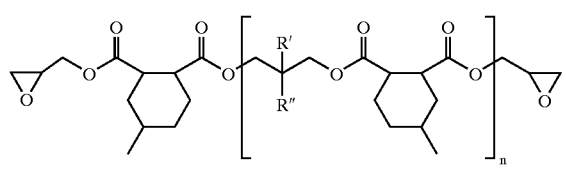

wherein R' and R" each independently represents an alkyl group, and n is an interger ranging from about 1 to about 15.

2. The curable coating composition of claim 1, wherein the coating composition is an electrodepositable coating composition.

3. The curable coating composition of claim 1, wherein the epoxy functional polyester (a) is prepared from reactants comprising:
   (1) the reaction product of a polyol and a polycarboxylic acid or anhydrides thereof; and
   (2) an epoxy functional material.

4. The curable coating composition of claim 4, wherein the polyol is saturated bisphenol A.

5. The curable coating composition of claim 4, wherein the anhydride of the polycarboxylic acid is methyl hexahydrophthalic anhydride.

6. The curable coating composition of claim 4, wherein the reaction product (1) is formed prior to reaction with the epoxy functional material (2).

7. The curable coating composition of claim 1, wherein and R" are independently selected from the group consisting of methyl, ethyl, propyl and butyl groups.

8. The curable coating composition of claim 7 wherein R' is an ethyl group and R" is a butyl group.

9. The curable coating composition of claim 1, wherein the polyoxyalkylene polyamine is a diamine.

10. The curable coating composition of claim 1, wherein the polyoxyalkylene polyamine is a primary amine.

11. The curable coating composition of claim 1, wherein the polyoxyalkylene polyamine is represented by the formula:

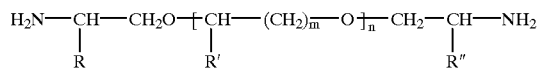

where R, R' and R" are selected from the group consisting of hydrogen and alkyl groups having about 1 to about 6 carbon atoms, where m is a number ranging from 0 to about 6, and where n is a number ranging from about 4 to about 40.

12. The curable coating composition of claim 1, wherein a ratio of the amine groups of the polyoxyalkylene polyamine to epoxy functional groups of the functional polyester ranges from about 0.26:1 to about 0.91:1.

13. The curable coating composition of claim 12, wherein the ratio is about 0.5:1.

14. The curable coating composition of claim 3, wherein the epoxy functional material (2) is epichlorohydrin.

15. The curable coating of claim 1, wherein the epoxy functional polyester (a) is essentially free of hydroxyl functionality.

16. The curable coating composition of claim 1, further comprising a carrier material.

17. A curable coating composition comprising an at least partially gelled ionic reaction product prepared from reactants comprising:

(a) an epoxy functional polyester; and
   (b) an amine-functional material wherein the epoxy functional polyester is selected from the group consisting of the following formulae (I) or (II)

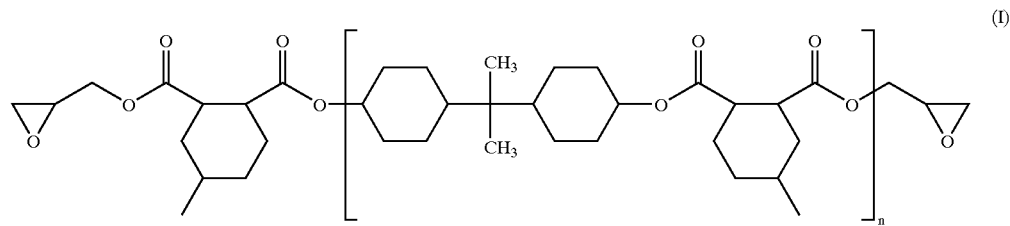

(I)

wherein n is an interger ranging from about 1 to about 15, and

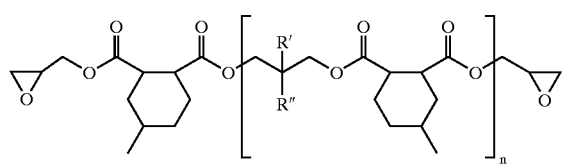

(II)

wherein R' and R" each independently represents an alkyl group, and n is an interger ranging from about 1 to about 15.

18. A curable coating composition of claim 17, wherein the epoxy functional polyester is prepared from reactants comprising: (1) the reaction product of a polyol and a polycarboxylic acid or anhydrides thereof; and (2) an epoxy functional material.

19. The curable coating composition of claim 17, wherein the amine-functional material is a primary amine, and wherein the reactants are essentially free of secondary amines.

* * * * *